United States Patent [19]

Coskun et al.

[11] Patent Number: 6,131,185
[45] Date of Patent: Oct. 10, 2000

[54] METHOD AND SYSTEM FOR VISUALLY DEBUGGING ON OBJECT IN AN OBJECT ORIENTED SYSTEM

[75] Inventors: Nurcan Coskun; Bruce Allan Tate, both of Austin, Tex.

[73] Assignee: International Business Machines Corporation, Armonk, N.Y.

[21] Appl. No.: 08/354,699

[22] Filed: Dec. 13, 1994

[51] Int. Cl.[7] .............................. G06F 9/44; G06F 11/00
[52] U.S. Cl. .................................. 717/4; 717/1; 714/39; 714/35; 345/333; 345/967
[58] Field of Search .......................... 395/700; 364/280, 364/280.2, 280.3, 280.9, 267.91, 275.5, 975.2, 975.4, 976, 978.2, DIG. 1, DIG. 2; 717/4, 1; 714/39, 38, 35, 47; 345/333, 326, 967

[56] References Cited

U.S. PATENT DOCUMENTS

| | | | |
|---|---|---|---|
| 4,827,404 | 5/1989 | Barstow et al. | 364/200 |
| 4,885,717 | 12/1989 | Beck et al. | 364/900 |
| 5,093,914 | 3/1992 | Coplien et al. | 395/700 |
| 5,124,989 | 6/1992 | Padawer et al. | 371/19 |
| 5,175,856 | 12/1992 | Van Dyke et al. . | |
| 5,179,702 | 1/1993 | Spix et al. . | |
| 5,187,789 | 2/1993 | O'Hair . | |
| 5,223,828 | 6/1993 | McKiel, Jr. . | |
| 5,237,691 | 8/1993 | Robinson et al. . | |
| 5,276,881 | 1/1994 | Chan et al. . | |
| 5,280,613 | 1/1994 | Chan et al. . | |
| 5,327,568 | 7/1994 | Maejima et al. | 395/800 |
| 5,410,648 | 4/1995 | Pazel | 395/158 |
| 5,432,903 | 7/1995 | Frid-Nielsen | 395/161 |

OTHER PUBLICATIONS

Moher, T, "Provide: A Process Visualization and Debugging Environment", IEEE Transactions on Software Engineering, vol. 14, No. 6, Jun. 1988.

*Primary Examiner*—Tariq R. Hafiz
*Assistant Examiner*—Tuan Q. Dam
*Attorney, Agent, or Firm*—Jeffrey S. LaBaw; Felsman, Bradley, Vaden, Gunter & Dillon, LLP

[57] ABSTRACT

A method and system for debugging an object from a plurality of objects forming an application in an object oriented system utilizing a graphic user interface. A number of the objects forming the application may include one or more action slots with each action slot containing one or more action objects. The present invention stores each action object with an action slot in an activation object in response to an event generated by user utilizing the graphic user interface. The event is associated with an action slot. Data sent to each action object is stored in the activation object. The data is data required to recreate the event caused by the user. Each time an event is generated, an activation object is created. These activation objects may be debugged utilizing a debugger.

21 Claims, 11 Drawing Sheets

METHOD AND SYSTEM FOR VISUALLY DEBUGGING ON OBJECT IN AN OBJECT ORIENTED SYSTEM

BACKGROUND OF THE INVENTION

1. Technical Field

The present invention generally relates to an improved data processing system and in particular to an improved method and system for programming in a graphic user interface. Still more particularly, the present invention relates to a method and system for visually debugging a program in a graphic user interface.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOMobjects Developer Toolkit Users Guide, Version 2.0, June 1993, available from International Business Machines Corporations. More information on object oriented systems in general may be found in Booch, Object Oriented Design With Applications, Benjamin/Cummings Publishing Company, Inc. (1991).

Programming Graphic User Interfaces (GUI) has become more and more difficult. New program systems, such as Presentation Manager (PM) available from International Business Machines Corporation or Windows available from Microsoft Corporation have made GUI's easier to use, but more difficult to program. "Windows" is a trademark of Microsoft Corporation. Object oriented programming has made this process easier. Visual builder systems also called "visual programming systems", such as Microsoft's Visual Basic, have made the process easier.

One possible design for a visual builder system employs an object oriented approach in which each element of a user interface, such as a window, a button, or an entry field, is treated as an object. The term "object" refers to an encapsulation of data and services that manipulate that data. Each object supports methods (such as resize), data (such as color), and events (such as button-was-pressed). Programming in such a system is performed by causing an event to execute a method on an object. This type of programming can be performed visually by drawing a line from the source object, which generates the event, to a target object on which a method is executed. A user can then specify which method is to be executed as depicted in FIG. 1. With reference to FIG. 1, a diagram of GUI containing a window in which visual programming may be performed is depicted. With reference to FIG. 1, graphic user interface 2 consists of a window 4 and a button 6. A user may draw a link 8 button 6 to window 4 using a mouse to manipulate pointer 7 and select a method called "Close". In response, selection of button 6 results in window 4 being closed. This type of interface is presented within SmallTalk Parts available from Digitalk, Inc. and VisualAge available from International Business Machines Corporation.

The term "mouse", when used in this document, refers to any type of operating system supported graphical pointing device including, but not limited to: a mouse, trackball, light pen, touch screen, and the like. A pointing device is typically employed by a user of a data processing system to interact with a data processing system's GUI. A "pointer" is an iconic image controlled by a mouse or other such device and is displayed on the video display device of a data processing system to visually indicate to the user icons, menus, or the like that may be selected or manipulated.

The visual programming approach using a visual builder system may be extended by allowing a user to write code in a window, such as window 200 in FIG. 2 and attach it an event, which may be accomplished using action objects. Action objects are objects that include data and a method. The data typically has a "name" portion (the name of the object) and "code" portion (the program that is typed by the user). The method is a trigger that executes the program in code. Action objects may be employed as a target object using the visual linking model described above. If the target object is not a script, a specialized action object, called a "method action object", can be employed. For method action objects, the instance data contains both a pointer to an object (called TargetObject), and the name of the method (called TargetMethod).

As can be seen with reference to FIG. 2, window 200 includes field 202, which is the name of the action object and field 204, which is the field in which the user types code for the action object. Whenever the trigger method is called on an action object, the target method is called on the target object.

Many programmers allow the user to design applications visually, as described above, but force the user to debug such applications using traditional non-visual mechanisms, such as through utilizing break points and single stepping. Such a debugging system is a procedural debugging system and is often employed to debug method implementations in object oriented systems. Therefore, it would be desirable to have a visual programming environment that provides a visual debugging mechanism to the user.

SUMMARY OF THE INVENTION

It is one object of the present invention to provide an improved data processing system.

It is another object of the present invention to provide an improved method and system for programming in a graphic user interface.

It is yet another object of the present invention to provide a method and system for visually debugging a program in an object oriented system having a graphic user interface.

The present invention provides a method and system for debugging an object from a plurality of objects forming an application in an object oriented system utilizing a graphic user interface. A number of the objects forming the application may include one or more action slots with each action slot containing one or more action objects. The present invention stores each action object with an action slot in an activation object in response to an event generated by user utilizing the graphic user interface. The event is associated with an action slot. Data sent to each action object is stored in the activation object. The data is data required to recreate the event caused by the user. Each time an event is generated, an activation object is created. These activation objects may be debugged utilizing a debugger.

Activation objects may be placed with a queue for debugging by the debugger. The activation object is debugged utilizing the action objects and the data stored with an activation object. In this manner, multi entry points for debugging an application are provided based on different events generated by a user.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 3:
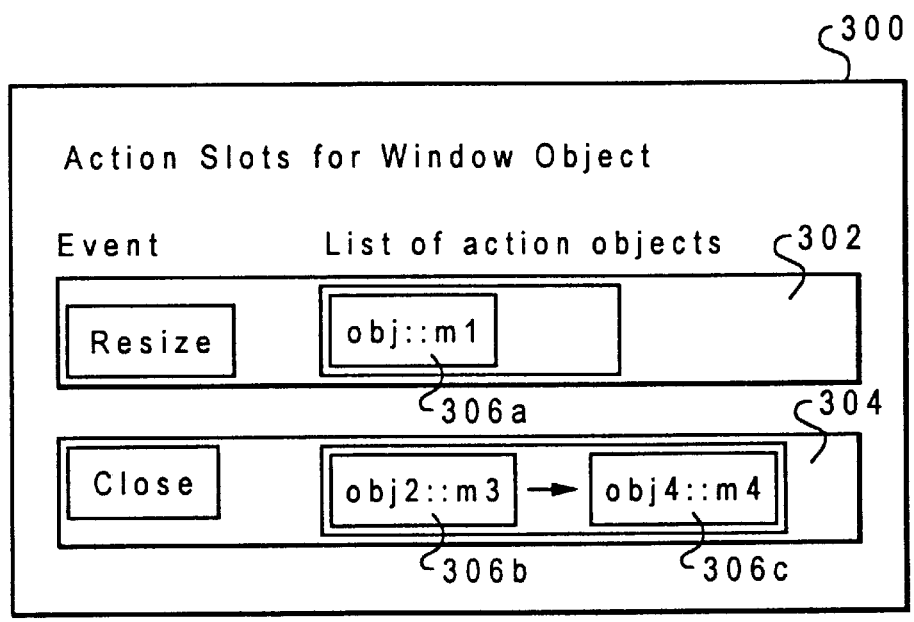
FIG. 3 depicts a data processing system in the form of a personal computer in which the present invention can be employed is depicted.

Referring now to the figures, and in particular to FIG. 3, a data processing system, personal computer system 410, in which the present invention can be employed is depicted. As shown, personal computer system 410 comprises a number of components, which are interconnected together. More particularly, a system unit 412 is coupled to and can drive an optional monitor 414 (such as a conventional video display). A system unit 412 also can be optionally coupled to input devices such as a PC keyboard 416 or a mouse 418. Mouse 418 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 420, also can be connected to the system unit 412. Finally, system unit 412 may include one or more mass storage devices such as the diskette drive 422.

As will be described below, the system unit 412 responds to input devices, such as PC keyboard 416, the mouse 418, or local area networking interfaces. Additionally, input/output (I/O) devices, such as floppy diskette drive 422, display 414, printer 420, and local area network communication system are connected to system unit 412 in a manner well known. Of course, those skilled in the art are aware that other conventional components also can be connected to the system unit 412 for interaction therewith. In accordance with the present invention, personal computer system 410 includes a system processor that is interconnected to a random access memory (RAM), a read only memory (ROM), and a plurality of I/O devices.

In normal use, personal computer system 410 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 4:
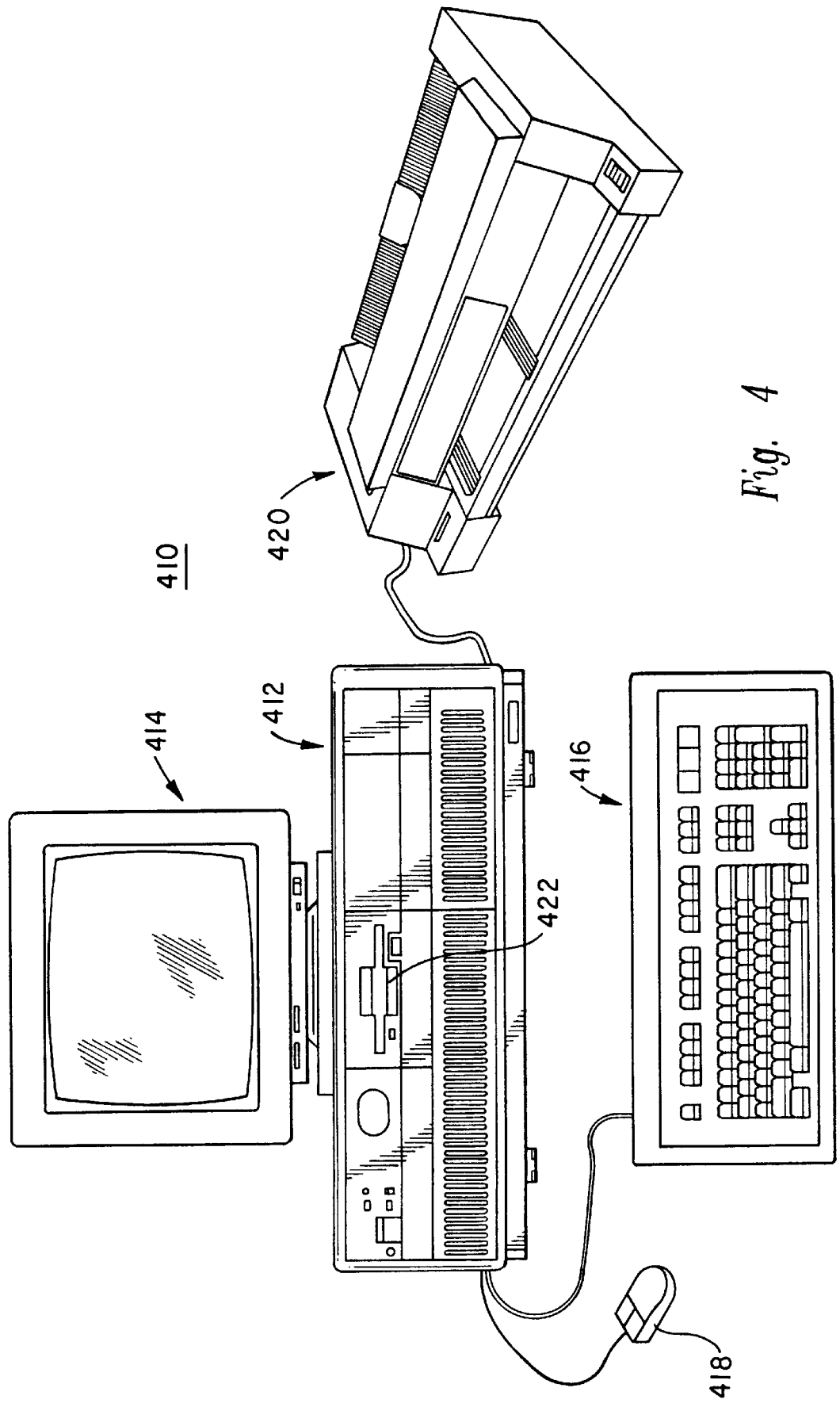
FIG. 4 is a block diagram of a personal computer system illustrating the various components of personal computer system in accordance with the present invention.

Prior to relating the above structure to the present invention, a summary of the operation in general of personal computer system 410 may merit review. Referring to FIG. 4, there is shown a block diagram of personal computer system 410 illustrating the various components of personal computer system 410 in accordance with the present invention. FIG. 4 further illustrates components of planar 511 and the connection of planar 511 to I/O slots 546a–546d and other hardware of personal computer system 410. Connected to planar 511 is the system central processing unit (CPU) 526 comprised of a microprocessor which is connected by a high speed CPU local bus 524 through a bus controlled timing unit 538 to a memory control unit 550 which is further connected to a volatile random access memory (RAM) 558. While any appropriate microprocessor can be used for CPU 526, one suitable microprocessor is the Pentium microprocessor, which is sold by Intel Corporation. "Pentium" is a trademark of Intel Corporation.

While the present invention is described hereinafter with particular reference to the system block diagram of FIG. 4, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 4, CPU local bus 524 (comprising data, address and control components) provides for the connection of CPU 526, an optional math coprocessor 527, a cache controller 528, and a cache memory 530. Also coupled on CPU local bus 524 is a buffer 532. Buffer 532 is itself connected to a slower speed (compared to the CPU local bus) system bus 534, also comprising address, data and control components. System bus 534 extends between buffer 532 and a further buffer 536. System bus 534 is further connected to a bus control and timing unit 538 and a Direct Memory Access (DMA) unit 540. DMA unit 540 is comprised of a central arbitration unit 548 and a DMA controller 541. Buffer 536 provides an interface between the system bus 534 and an optional feature bus such as the Micro Channel bus 544. "Micro Channel" is a registered trademark of International Business Machines Corporation. Connected to bus 544 are a plurality of I/O slots 546a–546d for receiving Micro Channel adapter cards which may be further connected to an I/O device or memory. In the depicted example, I/O slot 546a has a hard disk drive connected to it; I/O slot 546b has a CD-ROM drive connected to it; and I/O slot 546c has a ROM on an adapter card connected to it. Other devices, such as a modem may be connected to an I/O slot. An arbitration control bus 542 couples the DMA controller 541 and central arbitration unit 548 to I/O slots 546 and diskette adapter 582. Also connected to system bus 534 is a memory control unit 550 which is comprised of a memory controller 552, an address multiplexer 554, and a data buffer 556. Memory control unit 550 is further connected to a random access memory as represented by RAM module 558. Memory controller 552 includes the logic for mapping addresses to and from CPU 526 to particular areas of RAM 558. While the personal computer system 410 is shown with a basic 1 megabyte RAM module, it is understood that additional memory can be interconnected as represented in FIG. 3 by the optional memory modules 560 through 564.

A further buffer 566 is coupled between system bus 534 and a planar I/O bus 568. Planar I/O bus 568 includes address, data, and control components respectively. Coupled along planar bus 568 are a variety of I/O adapters and other peripheral components such as display adapter 570 (which is used to drive an optional display 414), a clock 572, non-volatile RAM 574 (hereinafter referred to as "NVRAM"), a RS232 adapter 576, a parallel adapter 578, a plurality of timers 580, a diskette adapter 582, a PC keyboard/mouse controller 584, and a read only memory (ROM) 586. The ROM 586 includes BIOS which provides the user transparent communications between many I/O devices.

Clock 572 is used for time of day calculations. NVRAM 574 is used to store system configuration data. That is, the NVRAM will contain values which describe the present configuration of the system. For example, NVRAM 574 contains information which describe the capacity of a fixed disk or diskette, the type of display, the amount of memory, etc. Of particular importance, NVRAM 574 will contain data which is used to describe the system console configuration; i.e., whether a PC keyboard is connected to the keyboard/mouse controller 584, a display controller is available or the ASCII terminal is connected to RS232 adapter 576. Furthermore, these data are stored in NVRAM 574 whenever a special configuration program is executed. The purpose of the configuration program is to store values characterizing the configuration of this system to NVRAM 576 which are saved when power is removed from the system.

Connected to keyboard/mouse controller 584 are ports A and B. These ports are used to connect a PC keyboard (as opposed to an ASCII terminal) and mouse to the PC system. Coupled to RS232 adapter unit 576 is an RS232 connector. An optional ASCII terminal can be coupled to the system through this connector.

Specifically, personal computer system 410 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 5:
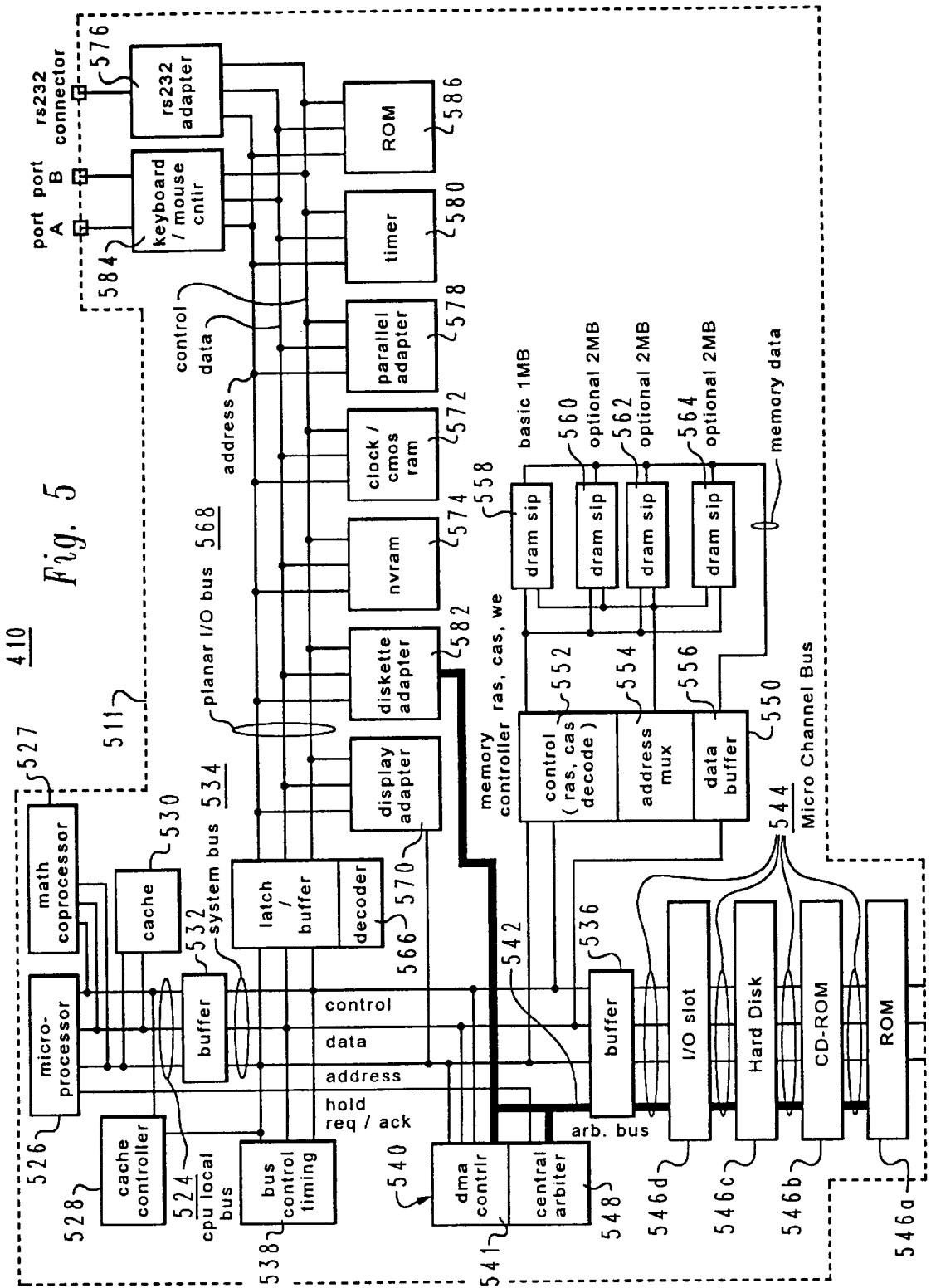
FIG. 5 is a diagram of objects in an object oriented system depicted in accordance with a preferred embodiment of the present invention.

With reference to FIG. 5, a diagram of objects in an object oriented system is depicted in accordance with a preferred embodiment of the present invention. An object encapsulates data and the methods needed to operate on that data. Objects can be represented by a "doughnut diagram" such as shown in FIG. 5. Object data is shown in the center 602 surrounded by the applicable methods 604 to 614. Data 602 may be modified only by the methods of that object. Methods 604–614 are invoked by receiving messages from other objects. A typical object oriented system will have a message router 620 that routes messages between objects. Thus, object 630 causes Method C 608 to be invoked by sending a message 632 to message router 620 that in turn sends message 622 to Method C 608 of object 600.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 6:
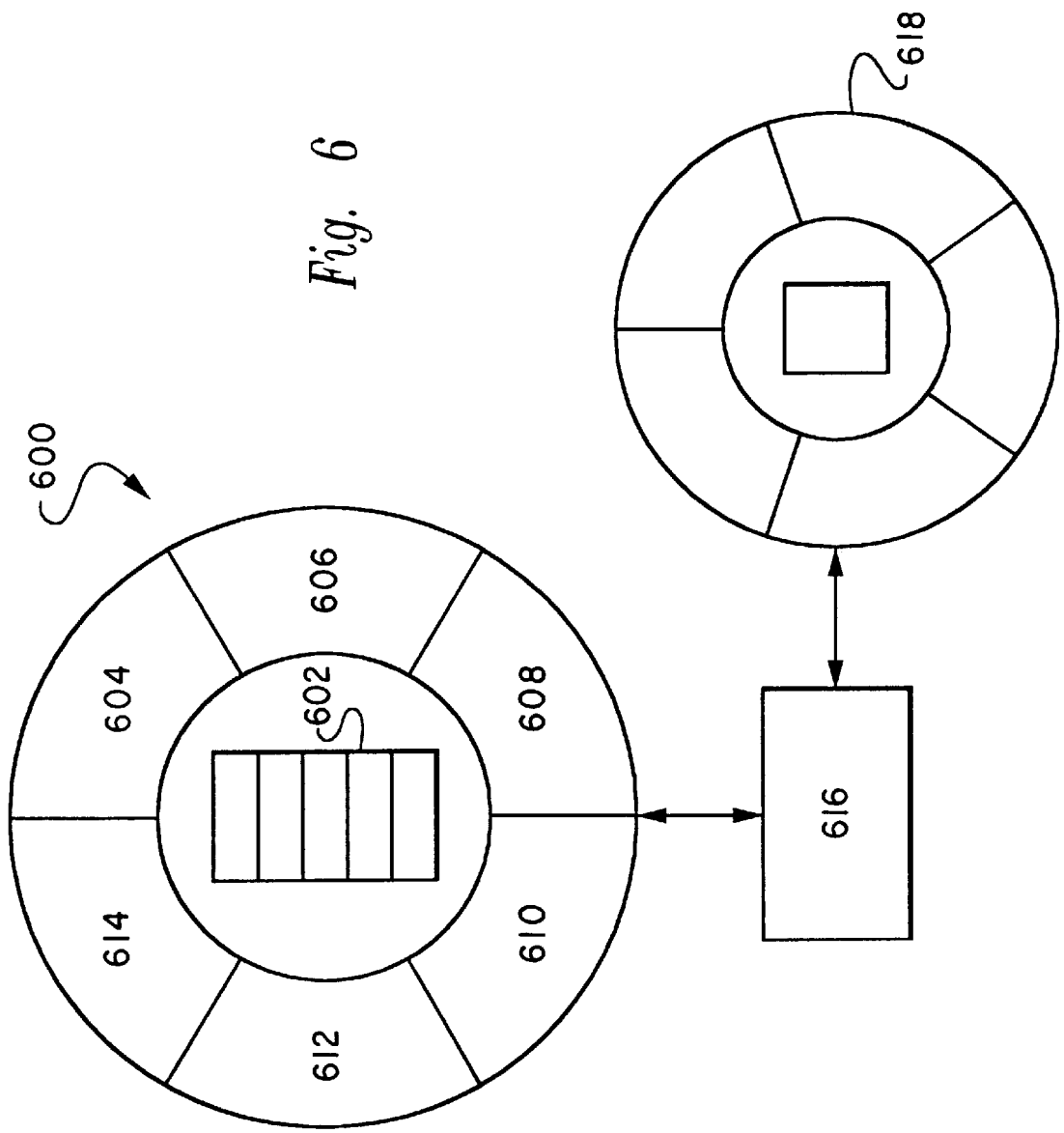
FIG. 6 depicts a diagram of an action object containing action slots in accordance with a preferred embodiment of the present invention.

With reference to FIG. 6, a diagram depicting action slots in an action object is depicted in accordance with a preferred embodiment of the present invention. Object 300 is called "Window" and includes action slots 302 and 304. Action slots define abstract events and multiple actions may be specified for each action slot. These action slots provide an association for each of the events that may be performed upon object 300 with object 300. Action slot 302 is a "Resize" action slot that will execute method m1 on obj each time that the Resize event occurs. Method m1 and object obj1, identifying the object upon which method m1 will be performed, are contained within action object 306*a* in action slot 304. Action slot 304 is a "Close" action slot that will execute methods m3 on object obj2 and m4 on object obj4 whenever a Close event occurs. Action slot 304 contains action objects 306*b* and 306*c*. Action object 306*b* contains method m3 and object obj2 as the identification of the object upon which method m3 will be performed. Action object 306*c* contains method m4 and identifies object obj4 as the object upon which method m4 will be performed.

Figure 7:
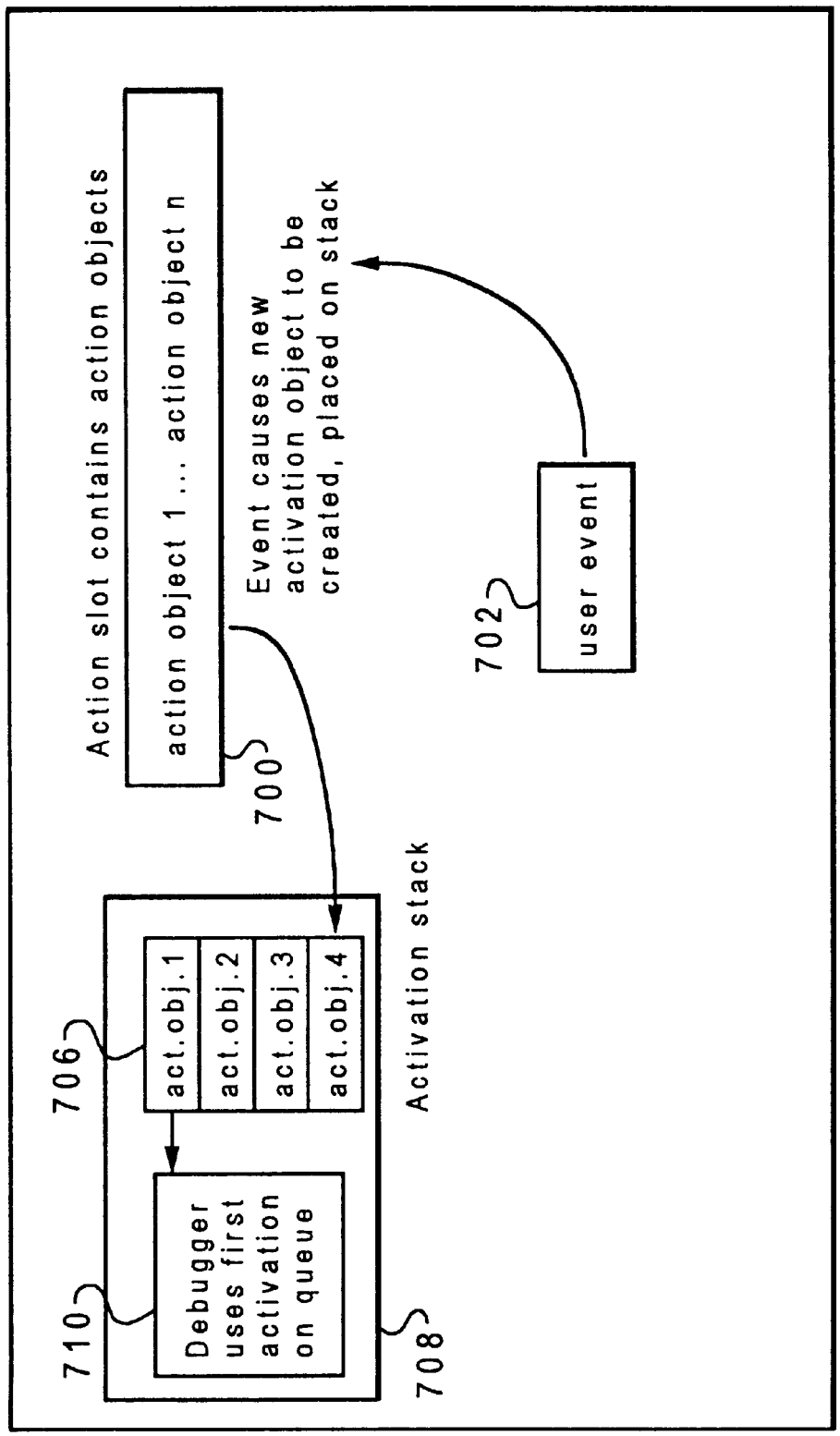
FIG. 7 is a diagram of components for visual debugging depicted in accordance with a preferred embodiment of the present invention.

The present invention provides a visual debugging system for use with a GUI in an object oriented system. With reference to FIG. 7, a diagram of components for visual debugging is depicted in accordance with a preferred embodiment of the present invention. Action slot 700 contains action object 1 through action object n that are activated in response to a user event 702. User event 702 causes an action object from within action slot 700 to be placed in activation stack 706 within debugger component 708. The action objects within activation stack 706 are debugged using debugger 710 within debugger component 708. Debugger 710 is a program or a collection of programs employed to detect, trace, and eliminate errors in computer programs or other software in accordance with a preferred embodiment of the present invention. Debuggers known to those skilled in the art may be modified by the teachings of the present invention to be employed in debugger 710. Activation objects are objects containing instance data for the action slot and the context. An activation object saves the context of an action slot activation along with a copy of the slot associated with the event.

Whenever action slot 700 is triggered by user event 702, the context of user event 702 (e.g., important variables and parameters, and the action slot) is stored within an activation object, such as act.obj. 1 . . . act.obj. 4. Context is information required to recreate an event. Context may include, for example, parameters, program variables, and CPU registers. The program or operating system employing a preferred embodiment of the present invention may affect the context that is required to recreate an event. Many types of context may occur depending on the requirements of the program or operating system incorporating a preferred embodiment of the present invention. For example, utilizing the present invention with Presentation Manager would require two parameters, mp1 and mp2. Other types of contexts, such as CPU registers, variables or other parameters may be used by a preferred embodiment of the present invention when required by the operating system.

Action objects within an action slot such as action objects action object 1 . . . action object N are stored in an activation object Debugger 710 within debugger component 708 is initialized with the context of the first activation object, act.obj. 1, within activation stack 706. The activation object triggers its action slot, which in turn executes all action objects in the slot and then debugs the triggered action slot by single stepping through the code or setting break points, as in traditional debuggers. When the activation is complete after all action objects have been triggered, the user then can proceed with the next activation object within activation stack 706 or perform more user actions which can generate still more activations for debugger component 708.

Figure 8:
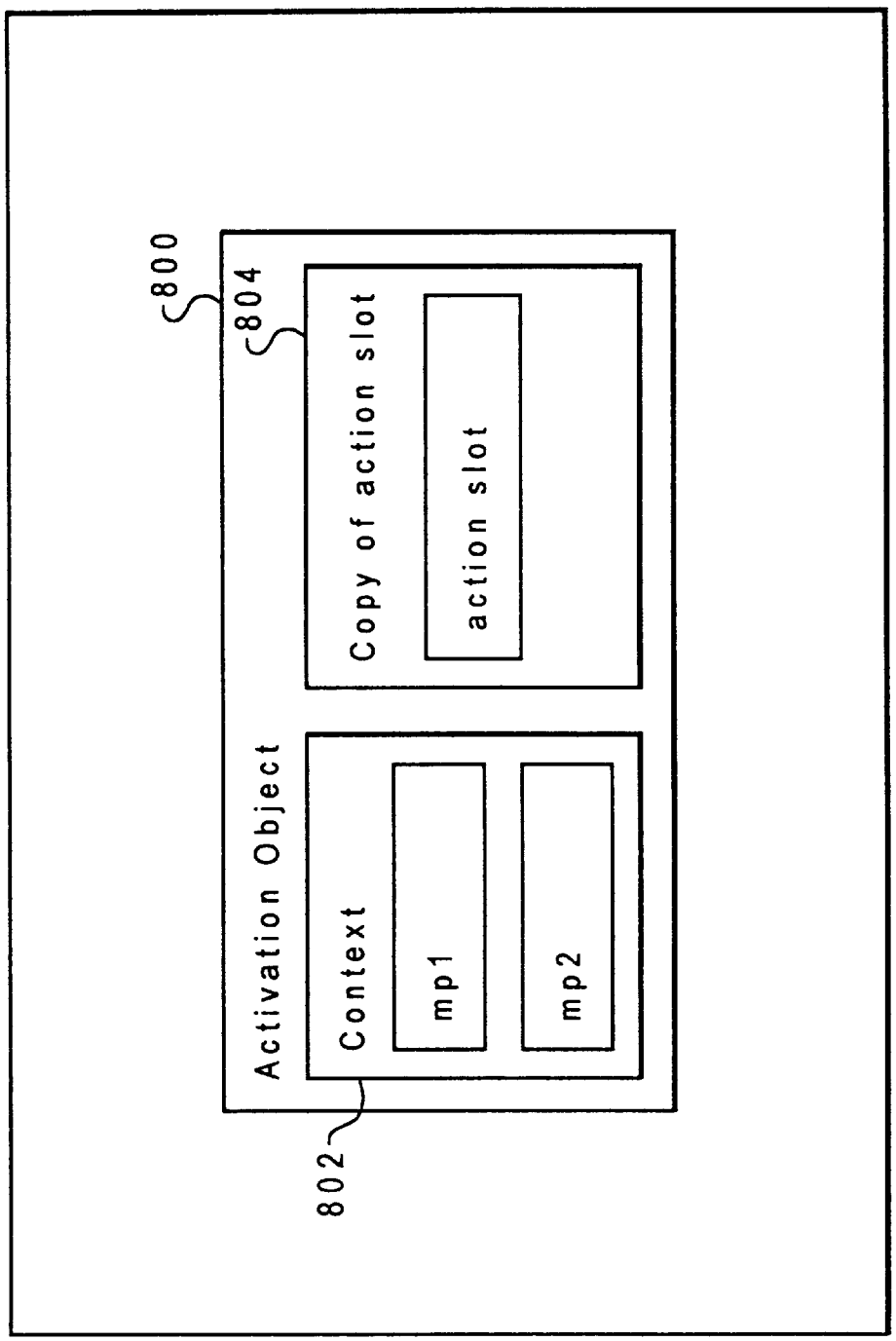
FIG. 8 is a diagram of an activation object illustrated in accordance with a preferred embodiment of the present invention.

An activation object is an object that contains an action slot and context required to reproduce the event triggering the action slot. The action slot in an activation object is a copy of the action slot triggered by an event, and action slots contain action objects which may trigger methods or scripts. With reference now to FIG. 8, a diagram of an activation object is illustrated in accordance with a preferred embodiment of the present invention. Activation object 800 includes context section 802, which is employed to store parameters mp1 and mp2 (which stands for message parameter 1 and message parameter 2) with each event in the depicted example. Other numbers of parameters may be stored in accordance with a preferred embodiment of the present invention. In this case, activation object 800 stores a copy of action slot 804 that contains one or more action objects (not shown) at the time the activation object was invoked, as well as the platform specific context, which is mp1 and mp2 in the depicted example.

Figure 9A:
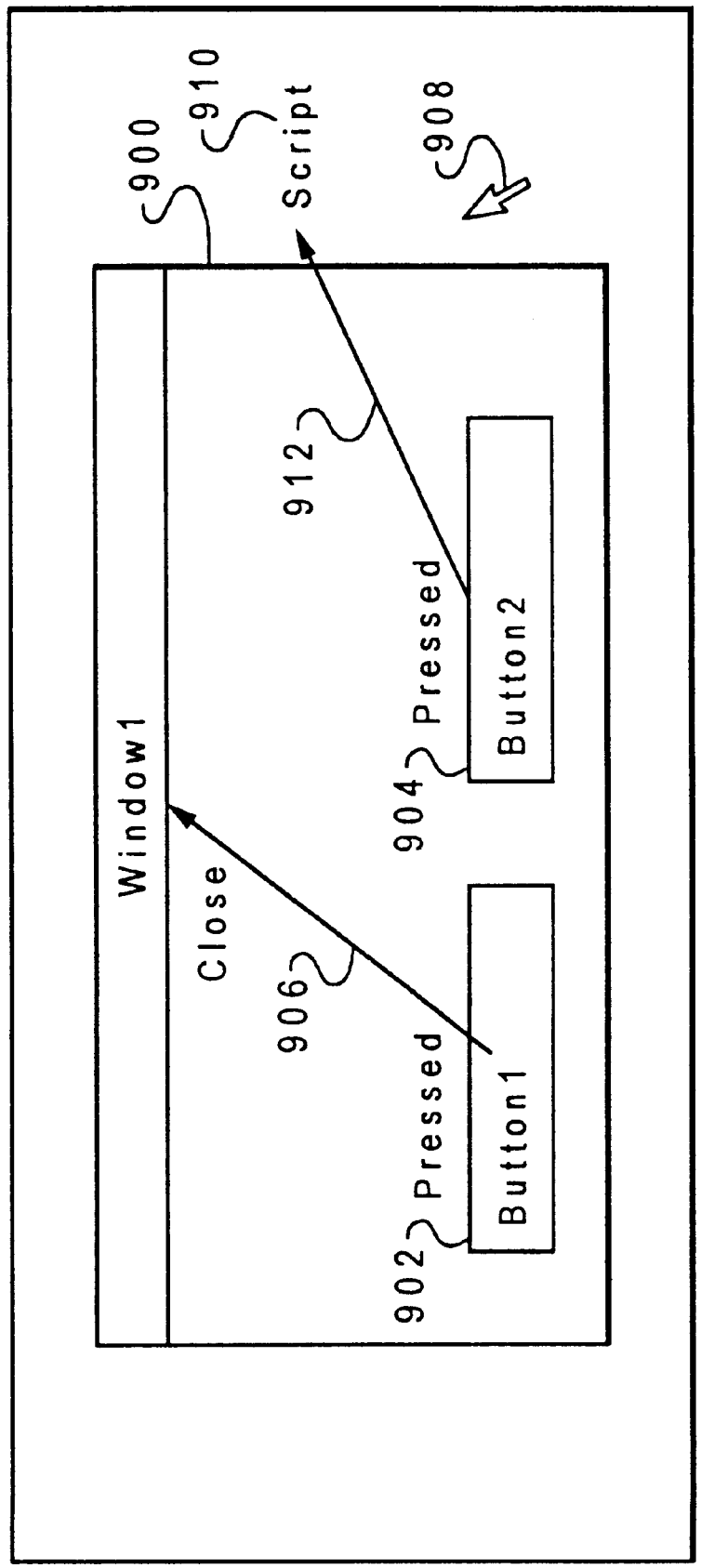
FIG. 9A is a pictorial illustration of a visual application containing two connections depicted in accordance with a preferred embodiment of the present invention.

With reference to FIG. 9A, a pictorial illustration of a visual application containing two connections is depicted in accordance with a preferred embodiment of the present invention. Window 900 includes two elements depicted as Button1 902 and Button2 904. Button1 902 has a connection 906 to the close method on Window 1 900. Manipulating this element Button1 902, by pressing it utilizing pointer 908 results in a method action object being invoked, which calls the close method on Window 900. As a result, when a user presses Button1 902, Window 900 will close. Button2 904 is connected to a script 910 via connector 912. When a user presses Button2 904, script 910 will be executed. Typically, the script is typed into a code editor, as in FIG. 2 which is not shown in this figure.

Figure 9B:
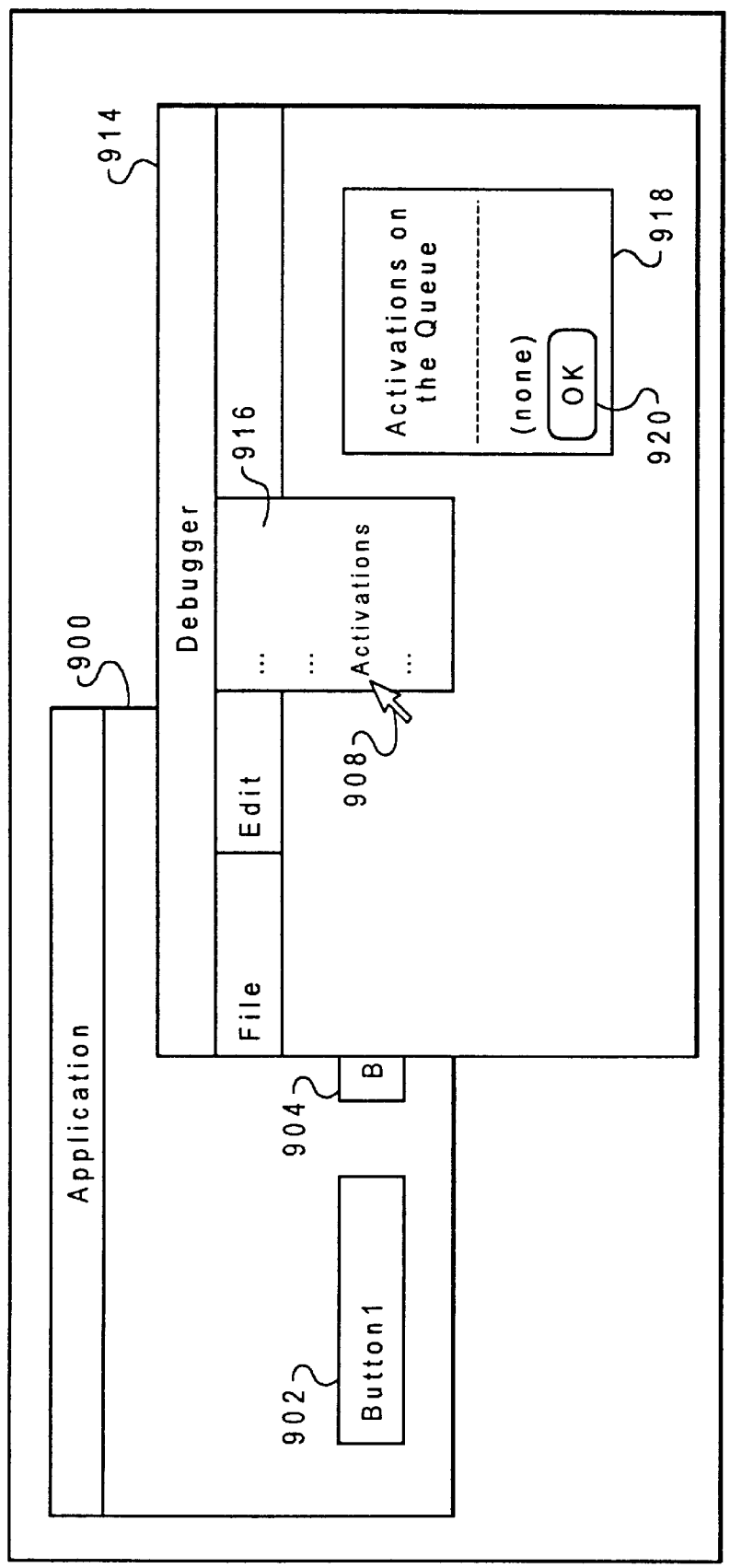
FIGS. 9B and 9C are pictorial illustrations of an application and a debugger window depicted in accordance with a preferred embodiment of the present invention.

With reference now to FIG. 9B, a pictorial illustration of an application and a debugger are depicted in accordance with a preferred embodiment of the present invention. In FIG. 9B, a debugger window 914 is presented to a user when the debugger is invoked. Additionally, window 900 is displayed to the user for visual debugging in accordance with a preferred embodiment of the present invention. In FIG. 9B, connections 906 and 912 and script 910 are not displayed. Selection of the choice "activations" from menu 916 causes list box 918 to be displayed to the user. In the depicted example, list box 918 illustrates no activation objects in the queue. Pressing button 920, which is labeled "OK", will close list box 918.

Figure 9C:
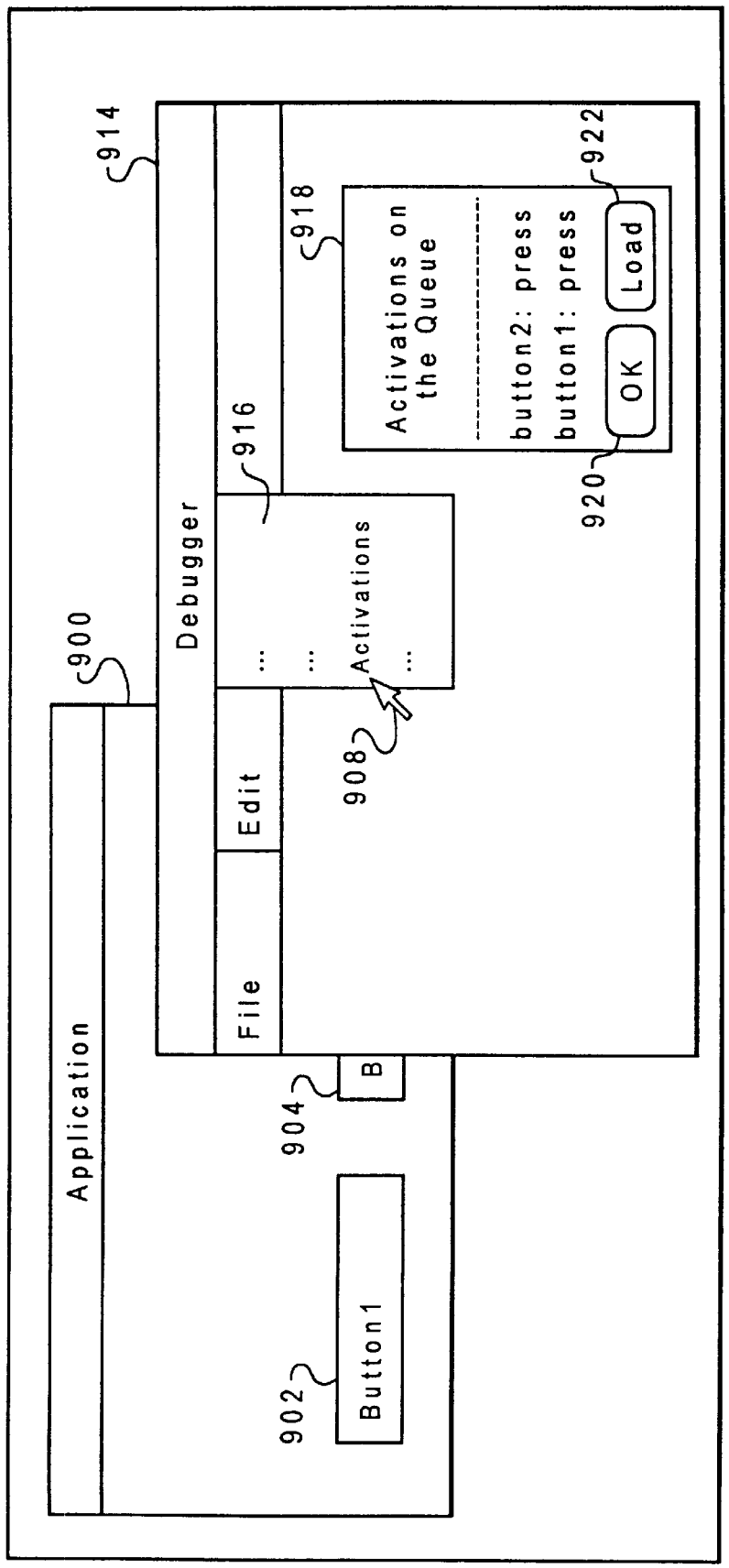

With reference now to FIG. 9C, a user has pressed Button2 904 and then Button1 902. As a result, list box 918 now contains entries. Each entry depicts the element and the event that has occurred. For example, the entry "button2;

press" indicates that Button2 904 has been manipulated by a user "pressing" the button. Each of these entries represents an activation object in accordance with a preferred embodiment of the present invention. An activation object may be debugged utilizing debugger 914 by pressing button 922, which is labeled "Load", the first entry in list box 918 is loaded for debugging in the depicted example, the activation object containing the action slot and action objects with the action slot associated with the event press will be loaded for debugging in the depicted example, the queue operates on a first in first out basis. When the debugging of the first entry is finished, the next activation object represented by the entry "button1: press" may be loaded and debugged.

Figure 10:
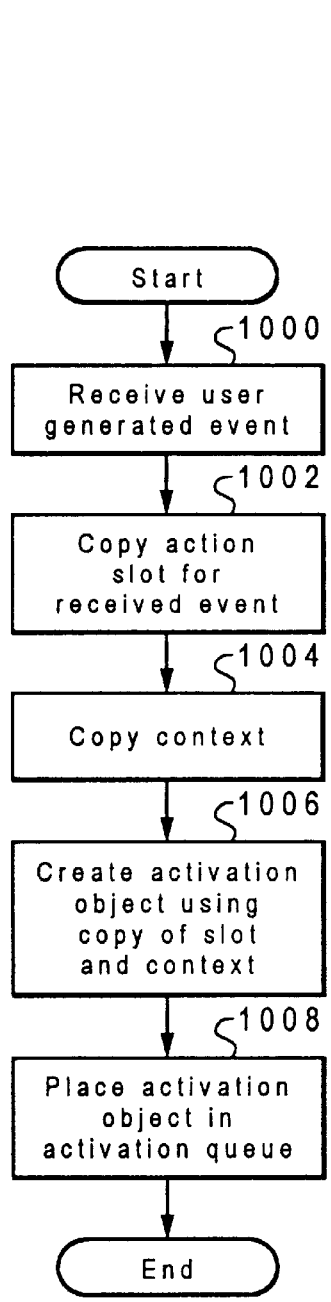
FIG. 10 is a flowchart of a process for creating an activation object and placing it within an activation stack depicted in accordance with a preferred embodiment of the present invention.

With reference now to FIG. 10, a flowchart of a process for creating an activation object and placing it within an activation stack is depicted in accordance with a preferred embodiment of the present invention. The process begins by receiving a user generated event on an object (step 1000). Thereafter, a copy of the action slot for the received event on the object is created (step 1002). Action slots are objects that contain action objects. Copying a slot results in the objects being copied. The context is copied into the context section of the activation object (step 1004). Next, the process creates an activation object using the copy of the action slot and the context (step 1006). In object oriented systems, objects are created by passing instance data to a component known to those skilled in the art as a "constructor" in the object oriented system. This component creates the object from the instance data. Instance data is data in an instance of an object. In the present invention, an activation object is created by passing a copy of the slot and the context to the constructor in an object oriented system to create an acitvation object in accordance with a preferred embodiment of the present invention. The process then places the activation object in the debugger's activation queue (step 1008) with the process terminating thereafter. The queue is a queue object that holds activation objects. Queues are common container objects in most object oriented systems and typically operate on the basis that the first object into a queue is the first object out of the queue.

Figure 11:
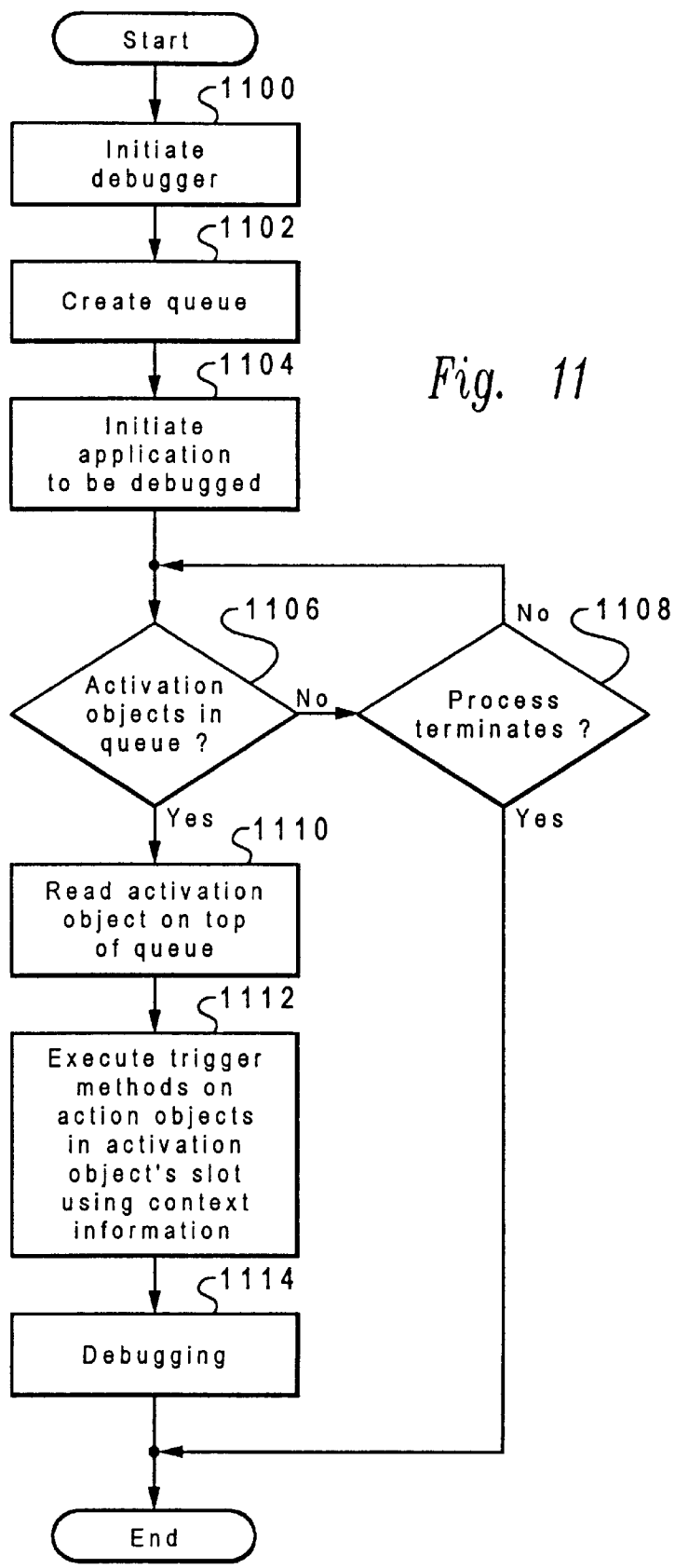
FIG. 11 is a flowchart of a process for initiating a debugger session depicted in accordance with a preferred embodiment of the present invention.

Referring next to FIG. 11, a flowchart of a process for initiating a debugger session is depicted in accordance with a preferred embodiment of the present invention. The process begins by initiating the debugger (step 1100). A queue is created for holding activation objects (step 1102). The process then initiates the application that is to be debugged (step 1104). This action may or may not generate activation events. Thereafter, the process determines whether activation objects are in the queue (step 1106). An activation occurs when a user manipulates elements within the application to be debugged causing an event to be generated. If activation objects are not in the queue, the process determines whether the process is to terminate (step 1108). Otherwise, the process reads the activation object on top of the queue (step 1110). Thereafter, the process executes trigger methods on the action objects contained in activation object's slot using the action object's context information (step 1112). The process then permits debugging (step 1114). In particular, the user may single step, watch variables, and perform other debugging task until all methods have been completed. The process then returns to step 1106 to determine whether other activation objects are present on the queue. If no additional activation objects are present on the queue, the process then terminates.

Figure 1:
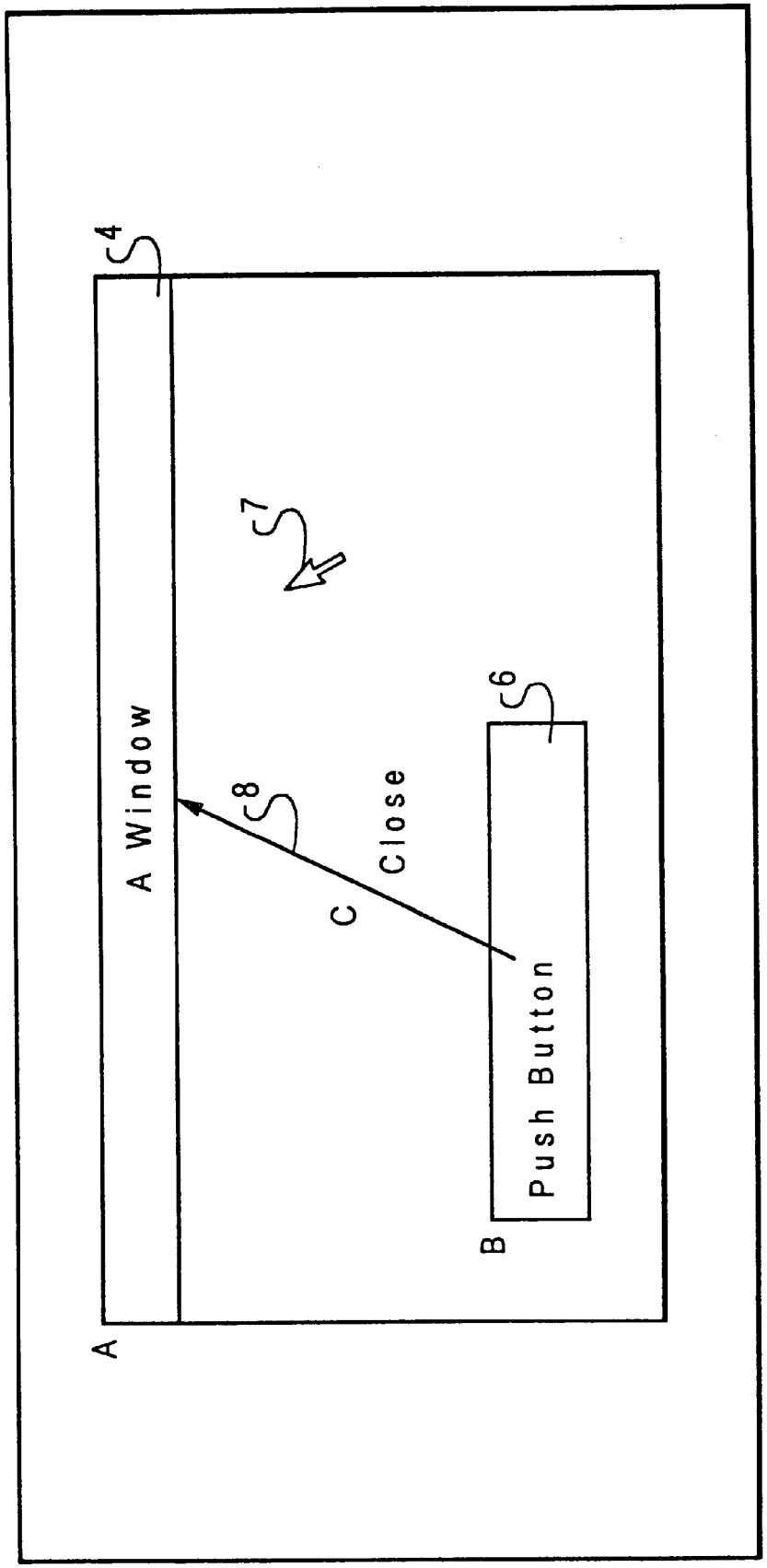
FIG. 1 depicts a window in which visual programming may be performed known in the art.
Figure 2:
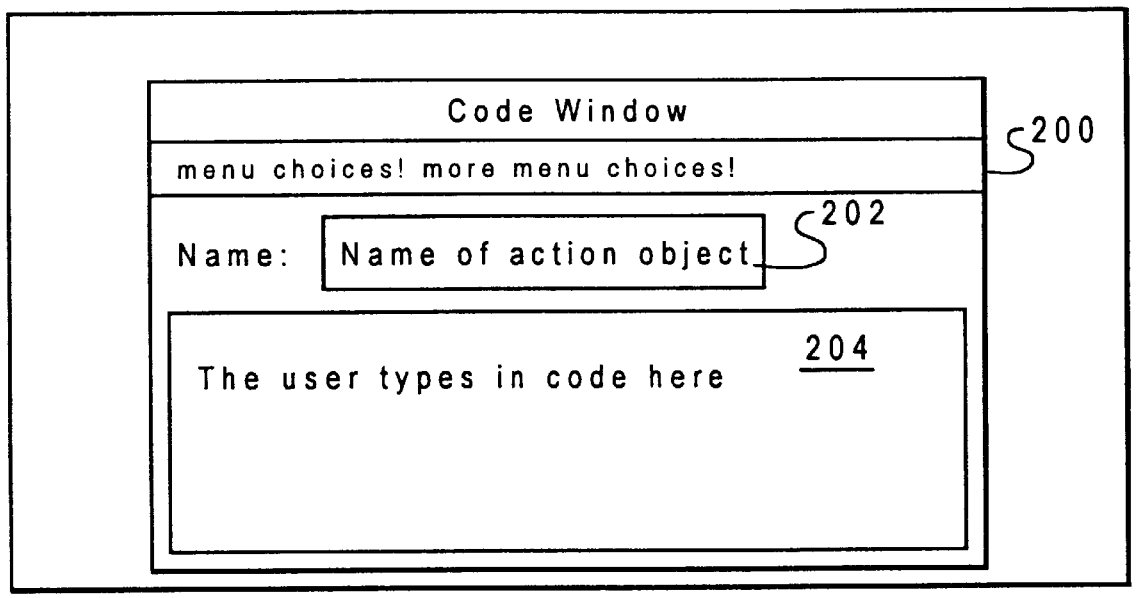
FIG. 2 is a diagram of a window for typing code known in the art.

The processes depicted and described in FIGS. 5–9 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a RAM, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

According to the present invention, debugging of applications in object oriented systems may be performed in manageable units corresponding to user events. Using the present invention, a user need not place break points after logical events to halt execution for debugging. Instead, the user can easily follow the execution control and debug the necessary events utilizing a preferred embodiment of the present invention. The present invention provides these advantages by utilizing an activation object as a unit of debugging rather than the entire application or program, which is often to broad. Under the present invention, multiple entry points to the debugging mode are provides through the different activation objects created in response to events generated by a user manipulating various elements in an application.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for debugging an object from a plurality of objects forming an application in an object oriented system utilizing a graphic user interface, wherein a number of the plurality of objects each includes at least one action slot, each action slot containing at least one action object, the method comprising the data processing system implemented steps of:

storing each action object within an action slot in an activation object in response to an event associated with the action slot generated by a user utilizing the graphic user interface; and storing data sent to each action object in the activation object, the data being data required to recreate the event, wherein action objects responsive to the event may be debugged.

2. The method of claim 1, wherein an activation object is created each time an event is generated and further comprising placing each activation object within a queue for debugging.

3. The method of claim 2, further comprising debugging each activation object within the queue.

4. The method of claim 3, wherein each action object includes code and wherein the step of debugging includes setting break points within the code.

5. The method of claim 3, wherein each activation object includes code and wherein the step of debugging includes single stepping through the code in each action object.

6. The method of claim 1, wherein the step of storing data sent to each action object includes storing program variables in the activation object.

7. The method of claim 1, wherein the step of storing data sent to each action object includes storing CPU registers in the activation object.

8. A method in a data processing system for debugging an object from a plurality of objects forming an application in an object oriented system utilizing a graphic user interface, wherein a number of the plurality of objects each includes at least one action slot, each action slot containing at least one action object, the method comprising the data processing system implemented steps of:

storing each action objects within an action slot in an activation object in response to an event associated with the action slot generated by a user utilizing the graphic user interface; and storing data sent to each action object in the activation object, the data being data required to recreate the event, wherein action objects responsive to the event may be debugged.

9. The method of claim 8, wherein an activation object is created each time an event is generated and further comprising placing each activation object within a queue for debugging.

10. The method of claim 9, further comprising debugging each activation object within the queue.

11. The method of claim 10, wherein each action object includes code and wherein the step of debugging includes setting break points within the code.

12. The method of claim 10, wherein each activation object includes code and wherein the step of debugging includes single stepping through the code in each action object.

13. The method of claim 8, wherein the step of storing data sent to each action object includes storing program variables in the activation object.

14. The method of claim 8, wherein the step of storing data sent to each action object includes storing CPU registers in the activation object.

15. A data processing system for debugging an object from a plurality of objects forming an application in an object oriented environment, the data processing system comprising:

a graphic user interface having a plurality of elements displayed within the graphic user interface, wherein each element within the plurality of elements generates an event in response to a manipulation of the element;

an application including a plurality of objects, wherein a number of the plurality of objects includes action slots, each action slot begin associated with an event and containing at least one action objects;

creation means for creating an activation object each time an event is generated from the graphic user interface, the creation means including a first storage means for storing each action object within the action slot associated with the event in the action object and a second storage means for storing data in the activation object, wherein the data is required to recreate the event; and a debugger, the debugger being utilized to debug each activation object created by the creation means utilizing each stored action object within an activation object and the data stored with the activation object.

16. The data processing system of claim 15, wherein the debugger includes a queue for containing each activation object created by the creation means.

17. A storage device readable by a data processing system and encoding data processing system executable instructions for debugging an object from a plurality of objects forming an application in a object oriented system using a graphic user interface, the data storage device comprising:

means for storing each action object within an action slot in an activation object in response to an event associated with the action slot generated by a user utilizing the graphic user interface;

means for storing data sent to each action object in the activation object, the data being required to recreate the event;

means for placing each activation object within a queue for debugging; and means for debugging each activation object within the queue utilizing each action object stored within an activation object and the data stored within the activation object, wherein the means are activated when the storage device is connected and accessed by a data processing system.

18. The storage device of claim 17, wherein the storage device is a hard disk drive.

19. The storage device of claim 17, wherein the storage device is a ROM for use with a data processing system.

20. The storage device of claim 17, wherein the storage device is a floppy diskette.

21. A method in a data processing system for debugging an object from a plurality of objects forming an application in an object oriented system utilizing a graphic user interface, wherein a number of the plurality of objects each include at least one action slot, each action slot containing at least one action object, the method comprising the data processing system implemented steps of:

identifying a manipulation of an object by a user;

storing an action object within an action slot in an activation object in response to an event associated with the action slot generated by the user manipulating the object in the graphic user interface;

storing a context of the user event, wherein the context includes parameters and program values and other information required to recreate the event; and placing the activation object into a queue for debugging, wherein the activation object is debugged as a unit without requiring the application for debugging.

\* \* \* \* \*